United States Patent
López De Teruel Alcolea et al.

(10) Patent No.: US 11,868,844 B2
(45) Date of Patent: Jan. 9, 2024

(54) VISUAL CODE AND METHOD FOR ENCODING AND DECODING A TWO-DIMENSIONAL IMAGE

(71) Applicant: UNIVERSIDAD DE MURCIA, Murcia (ES)

(72) Inventors: Pedro Enrique López De Teruel Alcolea, Murcia (ES); Alberto Ruiz Garcia, Murcia (ES); Felix Jesus García Clemente, Murcia (ES)

(73) Assignee: UNIVERSIDAD DE MURCIA, Murcia (ES)

( * ) Notice: Subject to any disclaimer, the term of this patent is extended or adjusted under 35 U.S.C. 154(b) by 0 days.

(21) Appl. No.: 17/766,378

(22) PCT Filed: Oct. 2, 2020

(86) PCT No.: PCT/ES2020/070599
§ 371 (c)(1),
(2) Date: Apr. 4, 2022

(87) PCT Pub. No.: WO2021/064273
PCT Pub. Date: Apr. 8, 2021

(65) Prior Publication Data
US 2023/0169288 A1   Jun. 1, 2023

(30) Foreign Application Priority Data
Oct. 4, 2019 (ES) .............. ES201930861

(51) Int. Cl.
*G06K 7/14* (2006.01)
*G06K 19/06* (2006.01)

(52) U.S. Cl.
CPC ..... *G06K 7/1417* (2013.01); *G06K 19/06037* (2013.01)

(58) Field of Classification Search
CPC .......... G06K 19/06037; G06K 7/1417; G06K 7/1426
See application file for complete search history.

(56) References Cited

U.S. PATENT DOCUMENTS

| | | | |
|---|---|---|---|
| 2,612,994 A | 10/1952 | Woodland et al. | |
| 5,726,435 A | 3/1998 | Hara et al. | |
| 2002/0044138 A1* | 4/2002 | Edso | G06K 19/06037 345/179 |

FOREIGN PATENT DOCUMENTS

| | | |
|---|---|---|
| CN | 108790469 A | 11/2018 |
| CN | 109981917 A | 7/2019 |

(Continued)

OTHER PUBLICATIONS

International Preliminary Report of Patentability and Written Opinion for Application No. PCT/ES2020/070599 issued by the International Bureau of WIPO, dated Apr. 5, 2022, 7 pages, Geneva, Switzerland.

(Continued)

*Primary Examiner* — Laura A Gudorf
(74) *Attorney, Agent, or Firm* — Peter B. Scull

(57) ABSTRACT

The present description relates to a 2D visual code based on the superposition of pure flat waves framed in black, designed to be read at long distances, with different types of degradation (noise, blurring or movement) and in adverse lighting conditions. To this end, the information carrying elements are waves that are distributed over the whole image. The combination of waves with different directions, frequencies, amplitudes and phases permits generating a high number of configurations that may be decoded in a robust and efficient manner.

20 Claims, 7 Drawing Sheets

(56) References Cited

FOREIGN PATENT DOCUMENTS

JP      2016165070 A      9/2016
WO    WO-2019043553 A1 *  3/2019

OTHER PUBLICATIONS

International Search Report of the International Searching Authority. International Application No. PCT/ES2020/070599 issued by the European Patent Office, dated Jan. 20, 2021, 3 pages, Rijswijk, NL.

* cited by examiner

VISUAL CODE AND METHOD FOR ENCODING AND DECODING A TWO-DIMENSIONAL IMAGE

This description relates to a visual code based on frequencies coding, including a synthesised image with a characteristic spectrum of frequencies, surrounded by a preferably dark colour frame.

The description also relates to a method for encoding a visual code such as the one described, and to a method for decoding such a visual code. It also relates to a computer program product to execute the encoding method, as well as to a computer program product to execute the decoding method.

The developments hereof fall within technologies for recognition and support of data, more specifically recording media for use with machines.

BACKGROUND

A visual code is a representation, for example, in printed or digital format, of certain information that may be automatically read by some type of image acquisition or capturing device connected to a computer or electronic system (the image acquisition or capturing device may be the computer or electronic system itself). As a carrier of a certain amount of information, its capacity is measured in the number of different combinations that may be stored and subsequently decoded. Therefore, its capacity may be quantified simply by a particular number N of bits stored.

Generally, these codes are used in a wide variety of applications in both industry and commerce, i.e. where a simple identification of any item for which performing a certain type of tracking is required. With the wide range of potential applications offered by the possibility of having quick access to information linked to each code, covering from the areas of commerce (stock control, quick calculation of the amount of a purchase, etc.) to health (immediate access to medical records, control of medical material, etc.), through security (access control, personnel identification, etc.), entertainment (video games, augmented reality), or industrial applications (control of manufacturing processes, traceability, etc.), it may be considered that visual codes are already ubiquitous in almost every area of the economy and society.

Historically, the first visual codes were one-dimensional (e.g., the popular bar codes), and were designed to be read by devices based on particular optical technology that, at that time, allowed for manufacturing sensors that were simpler and cheaper than cameras. These codes were quickly adopted by postal services in their early days, but they were later rapidly extended into the area of product labelling and identification, both in commercial and industrial environments, the range of sensors available becoming more widespread, currently often being already based on lasers or conventional cameras.

From the 1990s onwards, and precisely because of the increasing availability of digital image acquisition devices connectable with, for example, a computer system, two-dimensional codes began to evolve. A two-dimensional code, also referred to as matrix code, also represents information in a way that it is easily and automatically detectable and visually decodable, but it has the advantage of being able to store more information in the same area. The best-known visual code of this type is, without any doubt, the QR code.

The main feature of these QR codes is that they include two-dimensional binary matrices, wherein each cell may be of white or black colour, and which allow for various sizes (in number of cells) in order to offer a wide range of different capacities, wherein the QR codes with higher resolution may even encode up to complete URLs, with several hundred bytes.

Based on the QR codes previously described, other similar two-dimensional codes have been proposed. Some of the most popular examples are AztecCodes, AR Codes, DataMatrix, EZ codes, which are used in commercial, industrial, transport, video games or augmented reality areas, among many others. All of these designs are strictly binary, the respective codes being based on the exclusive use of black and white colours, usually in the form of a matrix divided into square cells, without lacking alternative designs either, such as circular ones which ShotCode is based on.

An additional idea, exploited by later proposals, is the extension of the original idea of two-dimensional binary matrix codes to include colours other than pure black and white (for example the primary colours red, green and blue, or their complementary colours cyan, magenta and yellow) to increase the capacity of the codes, while keeping the number of code cells limited. However, this type of codes with matrices of colour cells are not robust in adverse lighting conditions.

On the other hand, in traditional matrix codes, the storage capacity for a certain distance depends on the maximum angular resolution of the camera. The robustness of the decoding process critically depends on the integrity of the cells, which in low quality images is often fragile due to contamination of the grey levels of neighbouring cells. Because of this, the vast majority of known visual codes must reserve a significant number of bits to introduce some form of redundancy in order to detect (and in some cases even self-correct) possible errors in the decoding process (parity bits, checksums, CRCs, polynomial codes, Reed Solomon, etc.).

Consequently, there is a need for a visual code that at least partially solves the problems mentioned above.

SUMMARY

In one aspect, a visual code includes a two-dimensional image, which is the result of applying a predetermined mathematical operation (for example, an addition) to a number c of two-dimensional waves determined by at least two parameters, namely, a first spatial frequency u in a first direction and a second spatial frequency v in a second direction different from the first direction.

This construction of the visual code provides the necessary redundancy for error detection and correction, since it is based on the overall coherence of the component waves, without affectation by the random modification of a relatively large number of pixels to the decoding process.

In one example, the two-dimensional waves may be pure waves in the plane, such as two-dimensional sinusoids. The addition operation (also referred to as superposition) is a pointwise addition in the plane.

In another aspect, a method for encoding a two-dimensional image includes
predefining a collection of two-dimensional waves as potential components of the two-dimensional image, each of these two-dimensional waves being determined by at least two parameters, namely, a first spatial frequency u in a first direction and a second spatial frequency v in a second direction different from the first direction;

predetermining a natural number c of said two-dimensional waves to compose the two-dimensional image;

selecting a number c of two-dimensional waves from all those two-dimensional waves in the collection;

composing the two-dimensional image by applying a predetermined mathematical operation on the selected c two-dimensional waves;

forming a visual code by framing the two-dimensional image with a band of a predetermined colour whose contour is a predetermined closed flat curve; and reproducing the visual code on a label.

In another aspect, a method for decoding a visual code reproduced on an identification label includes capturing a flat image of the label using an optical sensor;

calculating the Discrete Fourier Transform (DFT) of this flat image;

extracting from this DFT c dominant frequency components, both for a first spatial frequency u' and for a second spatial frequency v and seeking an identification among these c dominant components of first spatial frequency u' and second spatial frequency v' with c two-dimensional waves from a predetermined collection of two-dimensional waves, each of which being determined by at least two parameters, namely, a first spatial frequency u in a first direction and a second spatial frequency v in a second direction different from the first direction.

The DFT may also provide the angular phases of the dominant frequency components. These phases may be associated with the closest values within a set of possible phases.

Other objects, advantages and features of embodiments of the inventions will become apparent to the person skilled in the art from the description and the claims or may be learned from practice of the inventions.

BRIEF DESCRIPTION OF THE DRAWINGS

Particular embodiments of the present developments will be described in the following by way of non-limiting example, with reference to the attached drawings, in which.

DETAILED DESCRIPTION

Figure 1:
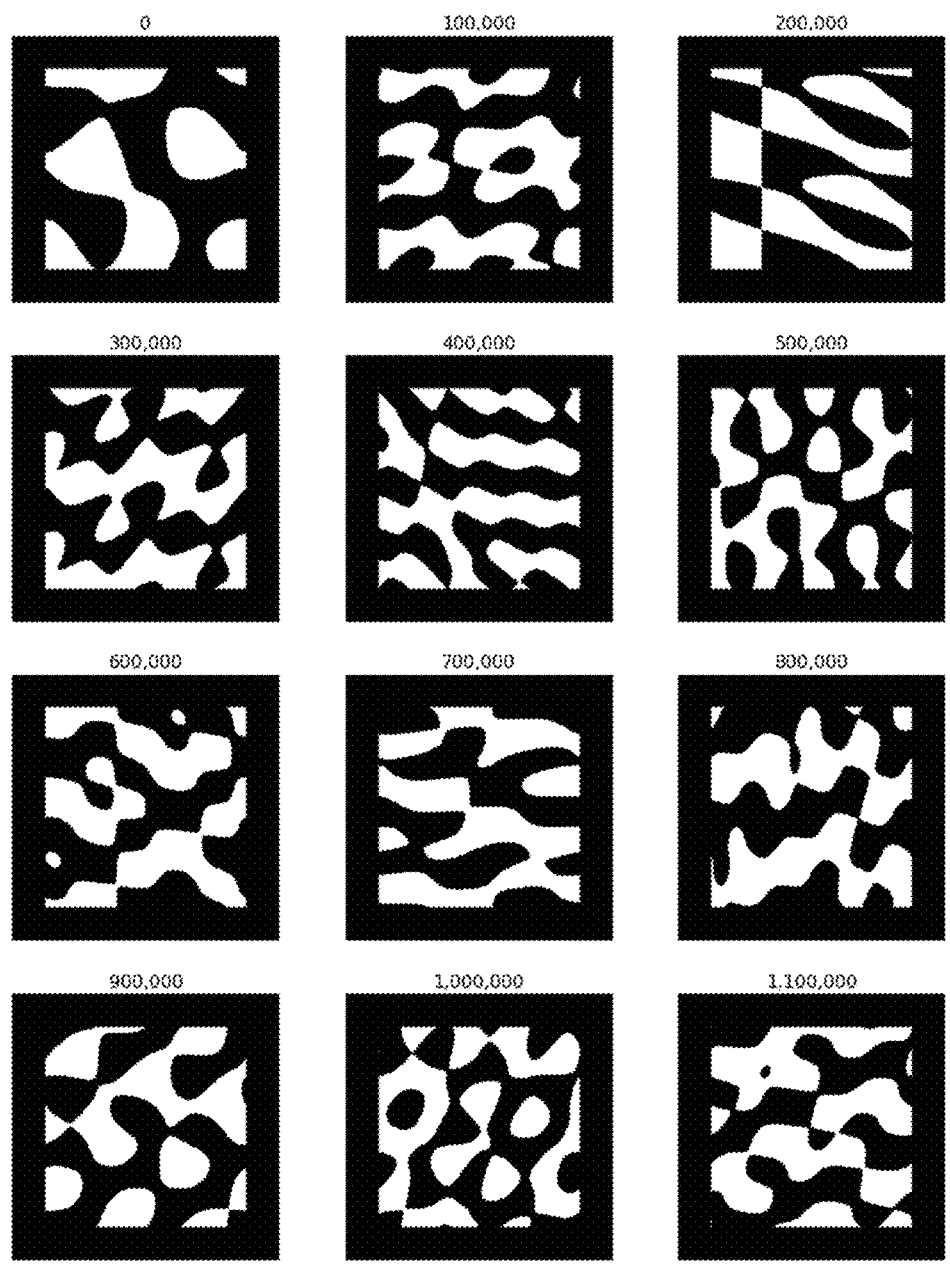
FIG. 1 shows several examples of visual codes according to the developments described herein.

Developments herein may include design of a visual code, together with corresponding automated methods for encoding and decoding it from images taken with a suitable capturing device, for example, a camera. The visual code is surrounded by a black contour to facilitate its location and may include a synthesized image with a characteristic spectrum of frequencies, explicitly designed to be decoded robustly and efficiently under problematic capture conditions, such as increasing degradation and loss of resolution that occur when the code to be identified is moved away from the optical sensor of a camera and/or the light conditions vary significantly.

These codes are designed to be printed on a label, paper, adhesive, plastic, fabric, or any other type of support that may be adhered to any type of potentially mobile asset (products, materials, people, etc.) which is of interest for tracking or traceability. A fundamental feature of these codes is thus that they are extremely robust to large lighting variations in the decoding scenario: typically, mainly the cameras are located statically at key points in the application scenario, although there is no limitation in the sense that they may also be detected by mobile cameras, such as cameras mounted on motorised barrows, but the codes are inevitably located on mobile assets, and may therefore suffer large variations in the lighting they receive. This greatly affects how they are sensed by corresponding image capturing devices. The main design considerations of the proposed visual codes are therefore mainly based on the idea of making the locating and subsequent decoding processes as robust as possible to image degradations that usually occur under such conditions of mobility and constant lighting changes.

On the other hand, the visual codes proposed herein may have, by construction, a high degree of redundancy that naturally provides great robustness in the decoding process. The code establishes a compromise between information storage capacity and robustness in the detection at long distances. This compromise is obtained by choosing the optimal set of frequencies and phases that may intervene in the codes depending on the effective resolution and dynamic range of a camera.

These codes are specially designed for industrial use; in particular, their main field of application is the identification of products, boxes or pallets in traceability control, although other alternative applications are not ruled out either, such as e.g. the location of people, vehicles or any other type of mobile assets. Using this technology, it is feasible to perform code reading from several meters away, even for label printing sizes relatively small (for example 5-10 cm side), requiring only a direct line of sight between the code and the image capturing device (usually a camera connected to a computer device, using any wireless or wired communication device, system or method). In addition, it may achieve simultaneous and computationally efficient reading of several codes in each captured image, thus allowing covering a wide visual and working space with a single capture. It is therefore a more economical and flexible solution than other identification systems, such as wireless solutions (for example RFID), which, in addition to being more expensive, may have fewer guarantees in poorly controlled environments where interferences may occur due to elements such as water or metal.

A visual code hereof may provide a) it is based on design principles that are radically different from those of previous visual codes, in particular, it does not use a two-dimensional matrix of cells;

b) the redundancy required for error detection and correction is based on the overall coherence of the component waves, which are completely extended on the image, without the random modification of a relatively large number of pixels affecting the decoding process; and c) the storage capacity may be graduated through simple configuration parameters, without the need to change the code design.

The configuration parameters include the maximum frequency allowed, related to the desired detection distance and effective angular resolution available; and the set of possible phases for these frequencies, related to the accuracy of the previous process of locating the code in the input image.

FIG. 1 shows several examples of visual codes. The visual appearance is novel and aesthetically attractive, with smooth curvature shapes (sometimes resembling zebra skin stains).

Figure 2:
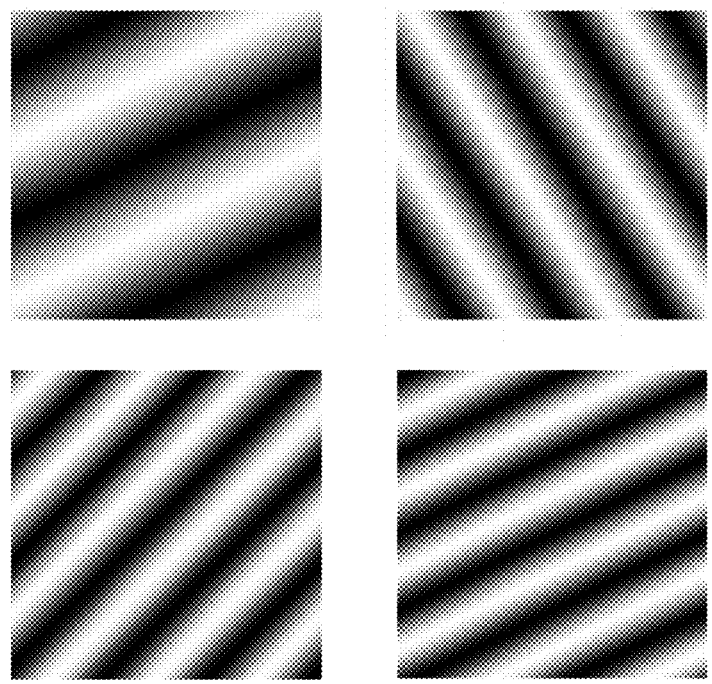
FIG. 2 shows the component waves of an exemplary visual code.

The visual codes hereof may be formed by the superposition (pointwise addition) of pure waves in a square region of the plane. FIG. 2 shows this type of waves, while FIG. 3 shows the result of the superposition.

Figure 3:
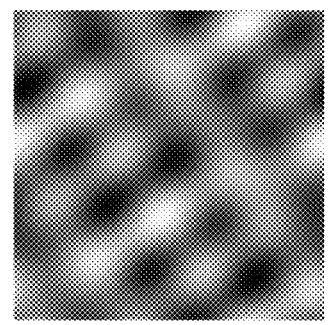
FIG. 3 shows the combination (sum) of the waves in FIG. 2.
Figure 4:
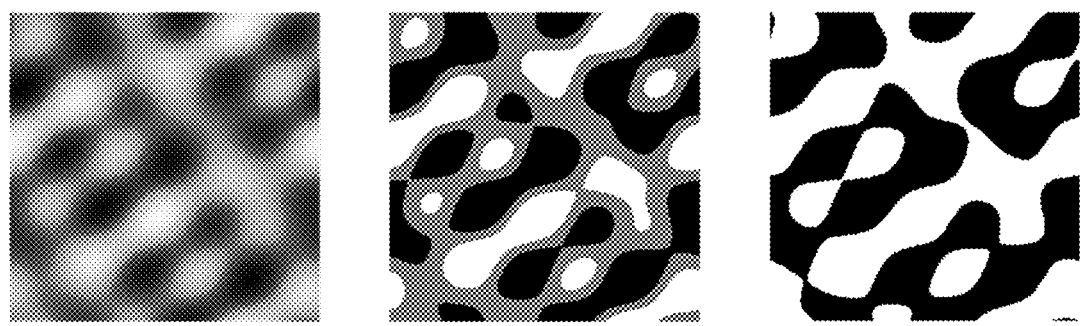
FIG. 4 shows a contrast amplification of FIG. 2: power 0.75, tritone and black/white.

The result of this sum is subjected to a final operation of normalisation which may simply include a range re-scaling to produce a "continuous" code as the one of FIG. 3, or of a non-linear contrast modification which, in practice, may be reduced to a simple thresholding. In this latter case, a black and white code is obtained, as the ones shown in FIG. 1, without intermediate grey levels. Alternatively, a thresholding of 3 levels may be applied: white, grey and black ("tritone" marker). The different types of contrast amplification are shown in FIG. 4.

This process reduces printing costs and, under some working conditions, may improve code discrimination. The decoding method that will be described below is completely independent of the contrast amplification chosen.

In detail, each of the waves that may be used to compose a certain code is specified by a tuple of three numbers (u, v, p), so that, for any position [x, y] in the plane:

$$\text{code}[x,y] = \Sigma_{k=1}^{c} \text{wave}(u_k, v_k, p_k)[x,y] \quad \text{(equation 1)}$$

wherein $$\text{wave}(u,v,p)[x,y] = \cos(2\pi(ux+vy)+p)$$

The numbers u and v are integers that represent respectively the vertical and horizontal frequencies of the wave in cycles per unit length (corresponding to the basis of representation of the 2D Discrete Fourier Transform (DFT)) and the real number p is the phase that is applied to the wave. In our case, the unit of length is determined by the side of the frame within which the code is included.

A real wave of parameters (u, v, p) is indistinguishable from the one defined by (−u, −v, −p), with opposite frequencies and phase, so the waves are specified by convention with tuples with u>0.

Figure 5:
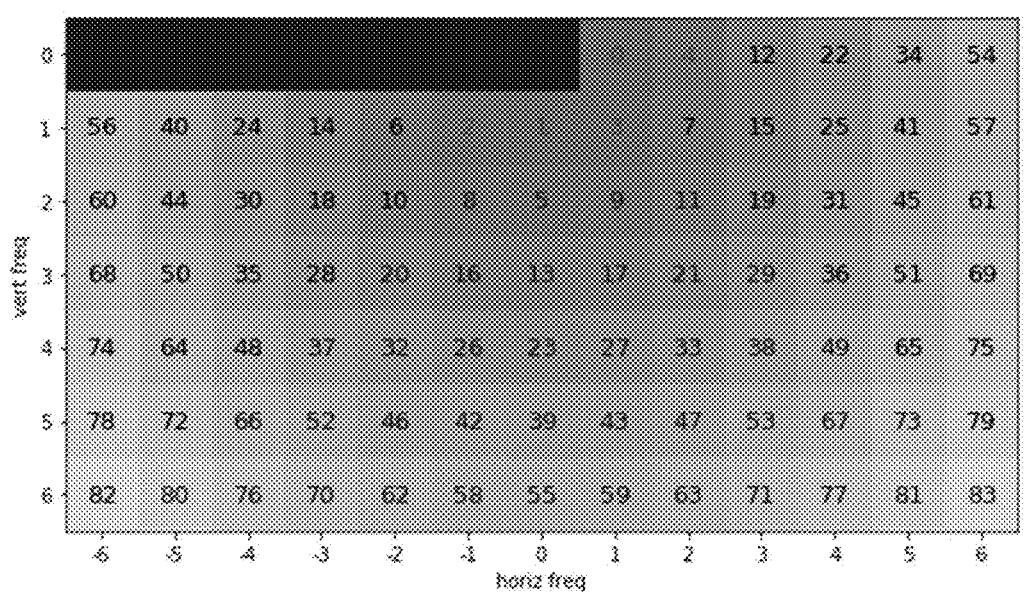
FIG. 5 shows an enumeration map of 2D frequencies.

Each frequency tuple (u, v) and its corresponding wave is referred to by a positive integer as shown in FIG. 5, so that these integers are in order for all possible tuples from lowest to highest scalar frequency $w=\sqrt{u^2+v^2}$ and, in the event of a tie, from lowest to highest horizontal frequency.

The set or catalogue of codes that are used in a particular application is defined by a certain "coding scheme", which includes: a set of frequencies, a set of phases and a number of components.

With regard to the set of frequencies, it is given by the minimum and maximum frequencies allowed to compose a code. For example, using FIG. 5, a coding scheme may use 29 waves, from wave number 5 to wave number 33.

The set of phases is the set of possible alternative phases that may be chosen for each wave. For example, a set with 4 equidistant phases is composed of $$A:\frac{\pi}{4}, B:\frac{3\pi}{4}, C=\frac{5\pi}{4}, D=\frac{7\pi}{4}$$

The coding scheme is completely determined by specifying the total number of c components that appear mixed in the code. In applications requiring high robustness against adverse conditions it is reasonable to establish between 3 and 6 components.

The combinatorial may be increased by choosing different amplitudes in the combination of waves. However, it is experimentally seen a rather irregular degree of attenuation of the different frequencies and, therefore, the use of intermediate amplitudes complicates the discrimination of spurious harmonics. Consequently, for greater robustness it is recommended to use the same amplitude in all the components of the code.

To simply represent a coding scheme, the following syntax is defined: c-RF-RP, wherein c is the number of components, RF is the set of frequencies and RP is the set of phases. As an example, a coding scheme of 4 components with frequencies from 5 to 33 and 4 phases (A-D), is completely specified by the expression: 4-5:33-ABCD.

To represent a visual code, each component is defined with the following syntax: $n_f\, l_p$; wherein $n_f$ indicates the frequency number in the set of frequencies and $l_p$ indicates the letter associated with the phase. As an example, the code in FIGS. 2, 3 and 4, which belongs to the coding scheme 4-5:33-ABCD, is fully specified by the expression: 9A 18A 29C 33B. The values 9, 18, 29 and 33 refer to the frequencies defined in FIG. 5 and the values A, B and C to the phases previously indicated.

The visual codes need an effective enumeration based on the chosen coding scheme. Therefore, each possible code in a given scheme is assigned a number between 1 and the total number of codes available. There exist several ways of performing the enumeration.

A possible enumeration is by frequency. In this enumeration the phases advance faster than the frequencies and these are sorted based on the highest of all. In this way, the numerical code is related to the maximum reading distance: the lower codes contain only low frequencies and may be read at longer distances. The higher codes contain higher frequencies and will be of shorter range.

The enumeration of possibilities using the coding scheme 4-5:33-ABCD (which works with combinations of 4 frequencies out of 29 that are possible, with 4 possible phases for each one, for a total of $$\binom{29}{4} \cdot 4^4 = 6,080,256$$

different combinations) and the enumeration by frequency may follow the following scheme:

| Order number | Code | Order number | Code |
|---|---|---|---|
| 1 | 5A 6A 7A 8A | ... | |
| 2 | 5A 6A 7A 8B | 256 (= $4^4$) | 5D 6D 7D 8D |
| 3 | 5A 6A 7A 8C | 257 | 5A 6A 7A 9A |
| 4 | 5A 6A 7A 8D | ... | |
| 5 | 5A 6A 7B 8A | 6080255 | 30D 31D 32D 33C |
| 6 | 5A 6A 7B 8B | 6080256 | 30D 31D 32D 33D |

Another alternative is enumeration by phase. In this mode of enumeration, the frequencies advance faster than the phases, so that codes that are close in the succession have a different frequencies structure. Therefore, if the phase detection is wrong, the estimated code has a very distant order number. This feature is useful to detect errors in work scenarios in which products are labelled with consecutive numbers in each session.

The enumeration sequence using again the same previous coding scheme 4-5:33-ABCD (with the same 6,080,256 associated possibilities), but using in this case the enumeration by phase is as follows:

| Order number | Code | Order number | Code |
|---|---|---|---|
| 1 | 5A 6A 7A 8A | ... | ... |
| 2 | 5A 6A 7A 9A | $23751 \left( = \binom{29}{4} \right)$ | 30A 31A 32A 33A |
| 3 | 5A 6A 7A 10A | 23572 | 5A 6A 7A 8B |
| 4 | 5A 6A 7A 11A | ... | |
| 5 | 5A 6A 7A 12A | 6080255 | 29D 31D 32D 33D |
| 6 | 5A 6A 7A 13A | 6080256 | 30D 31D 32D 33D |

Contrast amplification causes the component waves to no longer be pure sinusoids and the spectrum of frequencies to become contaminated with unwanted harmonics. This phenomenon is especially noticeable in black and white saturated codes.

In the one-dimensional case, the result of this type of saturation is a square wave, whose spectrum of frequencies includes, in addition to the fundamental w, successive 3w, 5w, etc. with gradually decreasing amplitudes ⅓, ⅕, etc. In two dimensions, the situation is more complicated, as complex interactions occur between the different spatial directions. As a consequence, there exist configurations such as, for example, 9A 10A 11C 18C which is perfectly valid in continuous mode (or tritone) but that in binary mode presents harmonics completely masking the frequencies of the code.

To avoid these situations, a list of exceptions for binary mode is pre-computed: given a coding scheme, all possible codes in black and white format are analysed, and all those frequencies configurations having potentially problematic harmonics are eliminated. Depending on the capacity of the coding scheme, this process takes between few minutes and several hours.

In many applications, the visual code may appear in any orientation relative to the camera's vertical, the determination of the correct orientation being necessary. In principle, this may be performed by including some additional element to the square frame, which may result aesthetically unattractive, or by using invariant codes at rotations of 90 degrees, which greatly reduces the storage capacity.

An additional advantage of these codes is the automatic detection of orientation thanks to the mathematical properties of the two-dimensional waves used as support of the information. A wave (u, v, p) is indistinguishable from (u, v, −p) in a marker rotated 180°, and in 90° rotations it is indistinguishable from waves that exchange u with v and may change the sign of v and/or p. To resolve this ambiguity, the following method is proposed.

The method may include restricting the lowest frequency wave to a certain quadrant (whose numbers appear in light colour in FIG. 5, approximately half of the total) and assigning a positive phase to said lowest frequency (codes A or B, in the scheme of 4 phases). This reduces the number of configurations to a quarter part, as may be expected from the four possible orientations of the code.

As may be seen from the decoding method, the composition and orientation of the code is determined along with a single frequency analysis by the (FFT).

Based on all the previously described, a method for encoding a visual code, defined a coding scheme c-RF-RP and an enumeration of the codes, given an integer n (desired number), a size of the result image M and a contrast amplification to between zero and one, may include the following:

1) Using the defined enumeration, obtaining the frequencies and phases of each of the components for the number n.
2) Constructing the combination of waves with Equation 1 considering an M×M plane.
3) To amplify the contrast, the result of each point in the M×M plane is raised to the power a (according to the formula $\text{sign}(r) \cdot |r|^a$, r being the input value, to handle both positive and negative values properly) and the final range of values is transformed linearly into the interval 0-255 (or the one corresponding to black and white, respectively, in the image format used).
4) To construct the black and white code, the previous operation is reduced to converting into 0 the points whose sum is negative and into 255 the points whose sum is positive. To create the tritone codes, it is applied the double threshold [0, 99]→0, [100, 155]→128, [156, 255]→255.
5) Finally, the black frame is added, and the image is printed.

Figure 6:
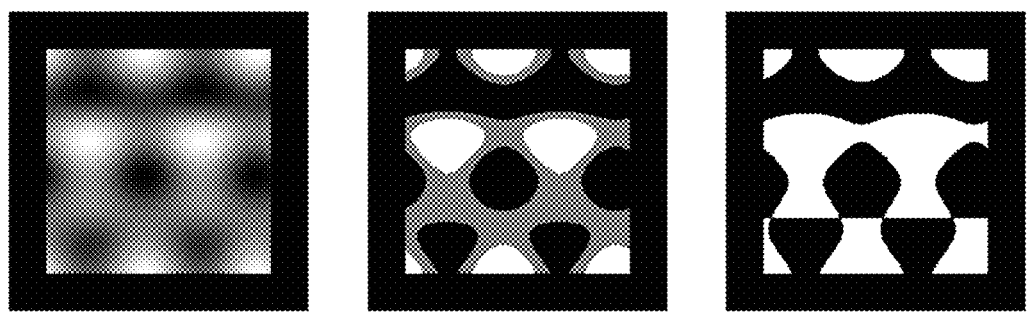
FIG. 6 shows another example of visual code.
Figure 7:
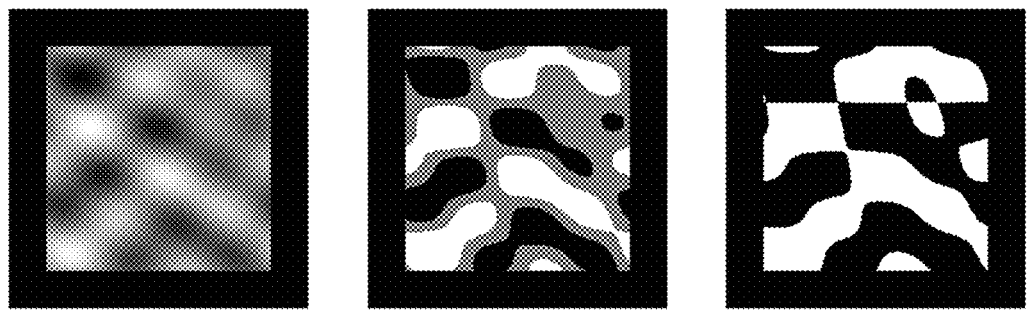
FIG. 7 shows a new example of visual code.

As examples, the code 5A 6D 7A 13D in the mentioned coding scheme 4-5:33-ABCD and the code 8B 9A 11D 20B are shown in FIGS. 6 and 7, respectively, with three variants of contrast amplification: a=0.75, tritone, and black and white.

For the operation 3), in an equivalent way, a complex matrix of size M×M initialized to zero may be used, in which the positions u, v corresponding to the frequencies $F_k$ are filled according to FIG. 5 with the value $e^{iP_k}$, and the real part of the Inverse Fast Fourier Transform (IFFT) is taken from this matrix.

To illustrate the storage capacity of a visual code hereof, the following table shows the number of different codes in various schemes of example including an automatic orientation detection. In the black and white scheme, the capacity is reduced by the list of exceptions. In the others, the maximum capacity is indicated without this type of reduction.

| Coding scheme | Contrast | Capacity |
|---|---|---|
| 4-5:33-ABCD | black and white | 1,293,184 |
| 5-5:43-ABCD | continuous/tritone | 151,138,816 |
| 6-5:33-ABCD | continuous/tritone | 509,267,968 |
| 6-5:33-ABCD | continuous/tritone | 3,448,807,424 |

Note, for the example in the first row of the table, that the original number of combinations $$\binom{29}{4} \cdot 4^4 = 6{,}080{,}256$$

has been reduced here to just over a million, for the two reasons explained above: firstly because of the division by 4 caused by the invariance to orientation, and secondly because of the number of exceptional combinations eliminated for having problematic harmonics (which in this case result to be 226,880). For this reason, the total number of combinations for this case is 6,080,256/4−226,880=1,293,184).

Figure 10:
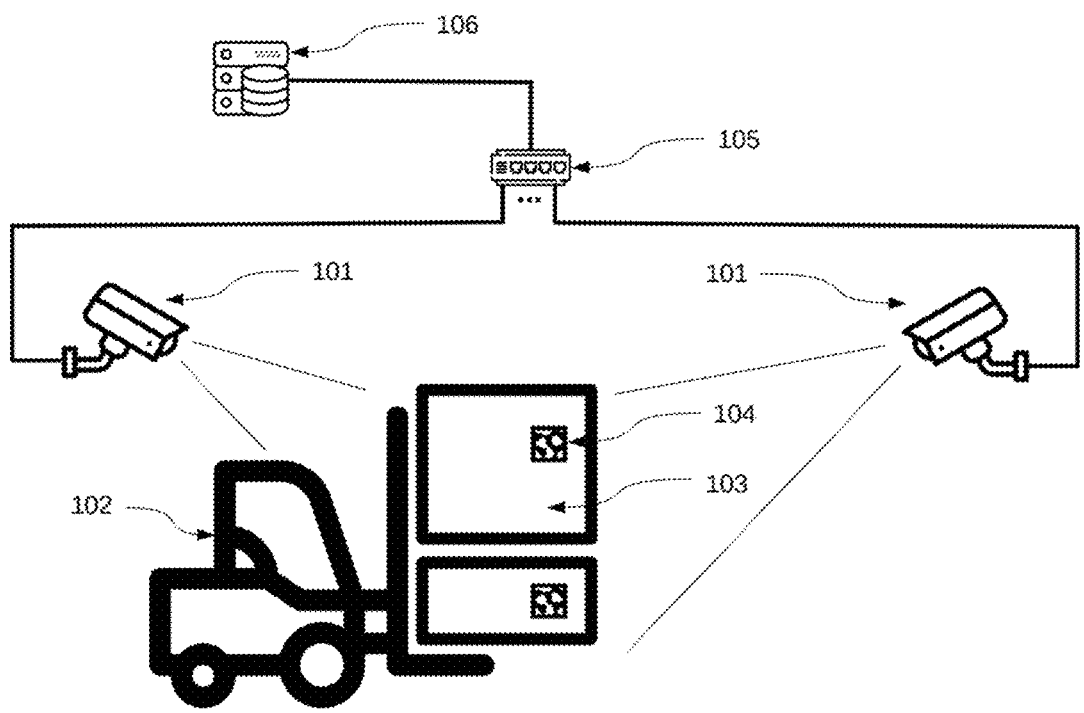
FIG. 10 schematically shows an application scenario, in which one or more cameras, connected to an intranet, send the images captured in a certain area of a plant to a central computer system (for example a server), where they are processed. Moving around the plant there are, for example, mobile barrows carrying some kind of product to which a label has been attached with one of the visual codes.

Once a label with a particular code has been printed on paper, adhesive, plastic, fabric or any other type of support that may be adhered to any type of asset (products, materials, people, etc.) for which it is interesting to perform a tracking or traceability, it is necessary to describe the method for correctly locating and decoding the code from an image in which the code is visible. A possible application scenario would be the one shown in FIG. 10, which will be described in detail later, wherein a series of one or more cameras 101, connected to an intranet 105 send the images captured in a certain area of a plant to a central system 106, where they will be processed. Moving around the plant there could be, for example, mobile barrows 102 carrying some kind of product 103 on which a label with one of the codes 104 has been attached. It is possible that several codes appear in a same image, as well as that, simultaneously, several cameras capture the same code or set of codes at a given moment. An image processing computer program installed on the server must process each input image to detect every one of the possible codes that are visible in each processed image. The operation s involved in this processing are described below, whose overall scheme is defined in two phases: location of codes in the image and decoding process.

Figure 8:
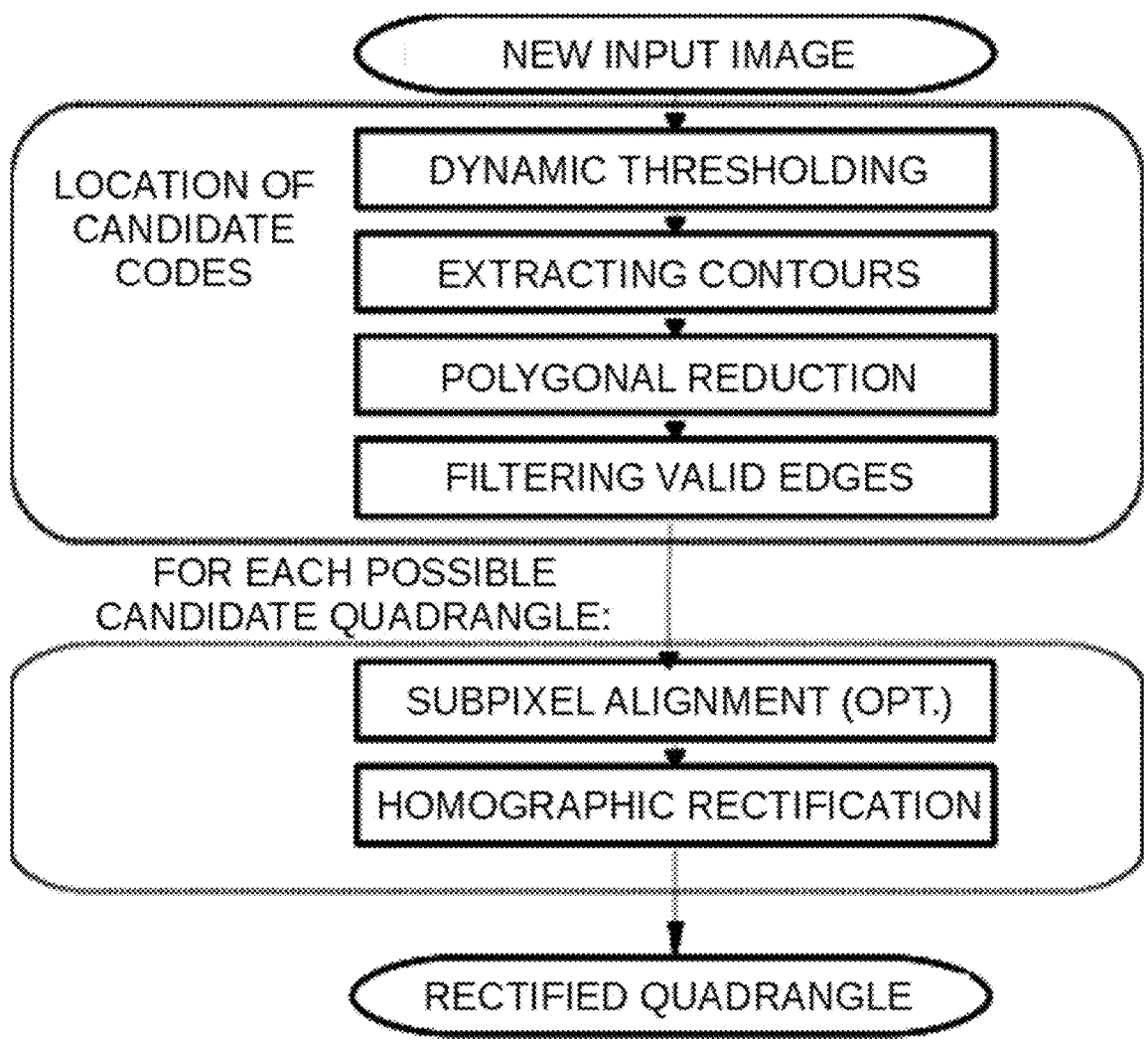
FIG. 8 shows a flow chart of a method for locating and rectifying possible candidate codes arranged in any positions of the image.

FIG. 8 shows in a schematic way the method for locating codes in the image. The method starts with the exact location in the scene of each candidate code. This is performed by first using a dynamic image thresholding algorithm, which takes into account the possible different lighting conditions in different areas of the input image. An adaptive threshold is used, which calculates the value of a different threshold for each position in the image, depending on the distribution of grey values in a small image region around each pixel. Next, it is proceeded with an algorithm of extracting closed contours on the resulting binarized image, which are subsequently reduced by a polygonal approximation. Only those contours that pass a test of being projectively equivalent to a square go to the next processing operation. It should also be considered here that the correction of possible radial distortion introduced by the camera is not considered necessary in principle, since the codes are explicitly designed to be small and to be seen at long distances. However, for their close viewing (for example with a smart phone or smartphone arranged close to the code), a pre-correction of such distortion may in some cases have to be made, especially for wide-angle lenses.

In a second processing operation, and after an optional sub-pixel alignment of each extracted contour, its four corners are used to perform a homographic rectification of the original image into a square canonical frame of sufficient size, for example (without loss of generality) of 100×100 pixels.

The method for decoding the visual code from a square image resulting from the above detection and rectification method is described below.

Once a coding scheme c-RF-RP and an enumeration of codes have been defined:

1) The Fast Fourier Transform (FFT) of the square area inner to the black frame is calculated.
2) The frequencies u<10 and |v|<10 are extracted from the FFT and those with a value lower than the minimum frequency of the coding scheme are discarded.
3) They are sorted from highest to lowest module and are normalized by dividing by the maximum module.
4) The phases of the c dominant frequency components are calculated, and for each of them, its phase closest to those available in RP.
5) If the defined enumeration applies the restriction indicated above, the positions and values of the c dominant components corresponding to the other three possible orientations of the code are calculated. This may be performed by successively rotating the image by 90° and repeating each time the previous operations 1 to 4.

Only one of the four alternatives is valid considering the frequency and phase restriction specified above.

The method ends by providing the corresponding number obtained from the detected components, which belong to the coding scheme, according to the defined enumeration.

Figure 9:
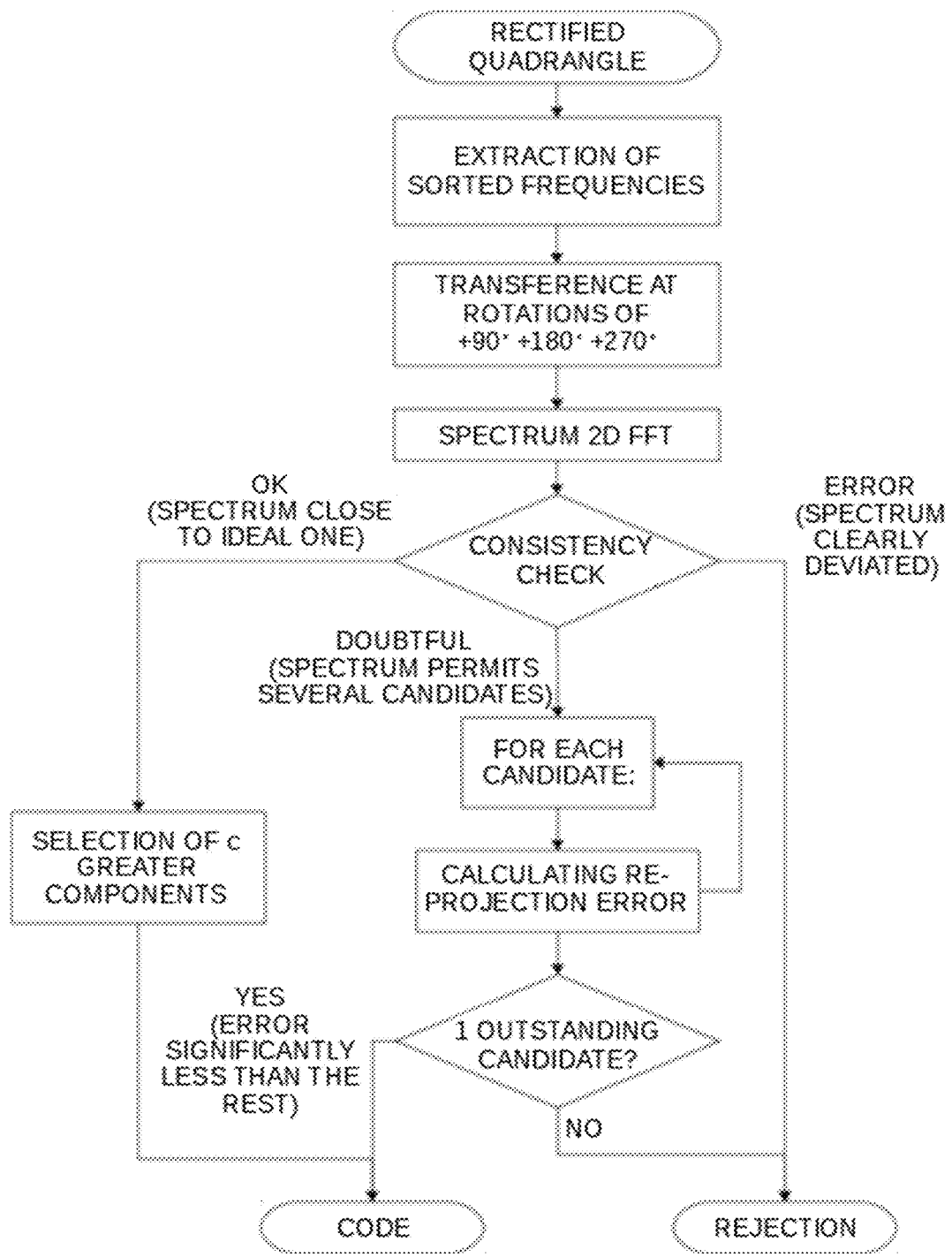
FIG. 9 shows a flow chart of a method for decoding a visual code.

It is advisable to extend the above decoding method to achieve protection against the possibility that, in very deteriorated images, alignment errors or image noise produce some false component that may even exceed in amplitude a true component wave. FIG. 9 shows in a schematic way this extended method. The fundamental modification with respect to the basic method is that, after extracting the frequency components and sorting them by their magnitude according to previous operations 1 to 4, it is possible to consider different subsets of c components out of the c+k components of greater magnitude (k being any small positive integer, for example, equal to 1 or 2). Naturally, this only has to be performed in the case that the spectrum of frequencies obtained raise any doubts, for example, because there is no clear jump in magnitude between the component c and the component c+1 (since the magnitudes of the FFT components obtained from the component c+1, the latter included, should ideally be cancelled out).

As shown in the method for FIG. 9, three distinct cases are then considered:

a) There are c non-null prominent components, with an appreciable jump in magnitude with respect to the component c+1, and with phases very close to the canonical phases A, B, C and/or D. In this case, there is a well detected code directly.
b) Between component c and c+1 this jump is not so clear. In this case, different combinations may be generated using different subsets of c elements out of the c+k components mentioned above and, for each of them, generating a synthetic image with which to compare pixel by pixel the original one duly rectified. If in these comparisons there is one standing out among the others because it is particularly close to the input image, the corresponding code is also given as correctly detected. Something similar may also be performed if, for example, one or more components have a phase distance with respect to the basic ones A, B, C or D greater than a certain threshold, thereby increasing the number of alternatives progressively in this case as well.

c) The obtained spectrum is clearly different from one with only c frequency peaks, or one or more of the obtained phases are very distanced from the canonical phases A, B, C and/or D, or finally, having tried the combinations mentioned in b), none of them stands out particularly when compared with the original one. In any of these cases the quadrangle is rejected and no code is considered as detected.

In the operation 5 of the method, it is proposed to successively rotate the image by 90°, calculating the FFT again and repeating the first operations, but this is an unnecessary waste of time, since the position and phase of the dominant elements in a 90° rotation are directly deductible from the original values.

The frequencies change easily:

$F(u,v) \leftarrow F(-v,u)$

To calculate the phase resulting from this rotation, a correction factor from the inversion of one of the axes of the frequency space must be taken into account. In a continuous domain (in the sense of non-discrete domain), the transform of a rotation is exactly the same as the rotation of the transform, but in the discrete case there is an asymmetry: the first sample coincides with the start of the sampling period while the last sample is within a sampling interval before the end. Taking this into account, for a resolution N×N the correction is $F(u,v) \leftarrow F(u,v) \exp(i2\pi v/N)$ Finally, a second correction must be applied to the phase, caused by the difference between the sampling intervals of the printed code (which usually has a moderately high resolution S×S to avoid pixelization, e.g. S=250) and the rectified input image (which has lower resolution, N×N, e.g. N=64, to speed up the decoding process). The correction is:

$$F(u,v) \leftarrow F(u,v) \exp\left(i\pi\left(\frac{1}{S} - \frac{1}{N}\right)(u+v)\right)$$

Under these conditions, if the previous process is applied directly to the pixel matrix of a continuous code (without contrast amplification), without passing through the printing process and capture process with a camera, the calculated phase coincides exactly (except for numerical noise) with the phase established when generating the code. In other words, phase detection does not introduce additional disturbances to those of sensorization and contrast amplification.

The extended method requires building several candidate codes to be compared with the input image. This may of course be performed by the general encoding method explained above, based on the Inverse Fourier Transform. However, only a small number of elements of the basis need to be composed, so it is more efficient to pre-compute in an array the waves of the set of frequencies. In this way, the generation of the code is simply reduced to the pointwise sum of the selected elements.

No operation is required to pre-process the rectified image. The decoding method works directly with the monochrome rectified quadrangle. In particular, no pre-filtering, either smoothing filter or high-pass filter, such as those used to remove noise or improve contrast in traditional matrix coding systems, is applied. No white balance, colour correction or histogram equalisation process is applied either. All the necessary and sufficient information for the decoding of a visual code in accordance herewith is extracted from the FFT of the original image.

Thanks to the calculation of the reconstruction error by synthesising candidates with pre-computed waves, the computation time of the decoding process is dominated by the essential operations of pre-rectifying the candidate quadrangle and the FFT of the operation 1. On a current computer the complete analysis of a region may be performed in a processing time in the order of 1 ms.

Scenarios of use may be proposed in which it is known beforehand that the visual code to be recognised cannot be any code, but it is necessarily within a more limited (and previously known) predetermined subset of codes. For example, it could be known, due to the particularities of the production process, that only a reduced set of, for example, 100 different codes could circulate in a given period of time in a plant. If these codes are previously known, the problem of their decoding does not arise, as in the method previously described, from absolute ignorance, but rather certain information is available beforehand which could be exploited to detect these codes even in extremely challenging lighting and/or image acquisition conditions.

Under these conditions, the reduced set of possible codes permits limiting the set of candidates generated in the extended method and, if desired, more permissive detection thresholds may be established, without the risk of increasing the probability of false positives.

In the following, an example is described of implementing the whole proposed code generation, detection and decoding scheme, specifically on the main plant of a company dedicated to the production and packaging of fresh fruit and vegetable products. The particular application scenario is the correct location and tracking over time and space of pallets carrying products, which are unloaded at the company's docks, and monitored from the moment they enter the packaging plant. To this end, the boxes with the products are labelled as soon as they are collected in the field, with visual codes such as the ones described, in a clearly visible place on them.

This example of implementation considers a coding scheme 4-5:33-ABCD, with a set of exceptions that allows 1,293,184 codes to be read with great robustness.

The sensorization system proposed for this example has a variable number of cameras, connected to the company's main network through Gigabit Ethernet technology.

In this particular implementation, cameras are used with resolutions of up to 3840×2160 pixels and 60 frames per second, and variable zoom lenses that allow viewing angles of between 37° and 109° horizontally. This is a direct implementation of the scheme already shown in FIG. 10: from their entry into the warehouse, the boxes 103 with the products from the loading docks, already duly labelled 104, are transported by palletizer barrows 102 through the interior of the packaging plant. The cameras 101 mounted at certain key points in the plant continuously monitor the evolution of the barrows, sending the images captured continuously to a central server 106, through a dedicated Intranet 105, whose bandwidth (1 Gbps) allows, in combination with an appropriate image compression factor, the simultaneous sending of several video sequences at tens of frames per second from multiple cameras (the cameras used are equipped with their own CPU and memory, to perform the compression of the video in real time, using the Zipstream technology; said technology uses an H264 codec with variable bitrate, which allows a speed in fps and bandwidth that are controllable from the central server).

At this point it is important to note that the communication between the cameras and the central server may be wired or wireless. In the case of wired communication, the connection may be performed via serial ports, such as USB, micro USB, mini USB, Firewire or Ethernet (such as the Intranet previously described). In the case of wireless communication, the connection may be performed via short range wireless communication modules (the cameras and the server are close enough to each other), for example, Bluetooth, NFC, Wifi, IEEE 802.11 or Zigbee. If the communications are long-range (the cameras and the server are far away from each other), the connection may be performed using communication modules based on GSM, GPRS, 3G, 4G, 5G or satellite technology (for example, if the communication is performed through a global communications network, such as the Internet) or even through a communications network for the Internet of Things (IoT). To secure the communication between the cameras and the server, this communication may be secured by, for example, user-name/password, cryptographic keys and/or by an SSL tunnel established in the communication.

Every time a new image arrives at the server 106, it is processed by the server through an implementation of the method described in FIGS. 8 and 9, locating and decoding, if necessary, all the visual labels detected in the scene. The implementation of this method may be performed, for example, in Python language, in its version 3.6, making use of the libraries OpenCV (version 3.4) and Numpy (version 1.14) for all the functions related to the image process: thresholding, contour extraction and polygonization, homographic alignment and rectification, and the frequency decoding process described herein. The interaction with the rest of the applications and databases relevant to the company's production and traceability control system is performed through a specifically designed REST API, which is supported by the Flask library (version 0.12). This Python code is executed, in this particular implementation, in a server with an i7 8-core CPU and 16 GB of RAM. The performance obtained depends on the resolution of the input images, which is (taking a particular example) of the order of about 20 milliseconds per frame for an input resolution of 1920×1080, with the possibility of detecting several codes (for example, up to 6) per image (without existing a strict limit in this sense either).

Finally, the viewing distance and correct decoding depend, in turn, on both the focal length of the camera (and therefore its field of view) and the image resolution used. The coding scheme chosen in this particular implementation (4-5:33-ABCD), contains frequencies of up to 4.5 cycles per side, which requires a resolution higher than the Nyquist sampling rate of 9 samples per cycle. In theory, it is more than sufficient to work with a safety margin with a size of at least 12×12 pixels excluding the black frame. In practice, the actual angular resolution available depends on many factors: lighting, quality of optics, blurring, etc., so for greater robustness it is recommended to work with markers of at least 18×18 pixels including the black frame.

Properly trying with variable zoom optics and depending on the physical printing size of the label, this is equivalent to possible decoding distances of even tens of meters. The following table shows some particular scenarios of example:

| Field of view | Resolution | Label size | Approximate distance |
|---|---|---|---|
| 37° | 1980 × 1080 | 50 mm | 8m |
| 90° | 1980 × 1080 | 200 mm | 11m |
| 37° | 3840 × 2160 | 50 mm | 15m |
| 37° | 1980 × 1080 | 100 mm | 16m |
| 90° | 3840 × 2160 | 200 mm | 21m |
| 37° | 3840 × 2160 | 100 mm | 31m |

All the above possibilities actually correspond to the following general formula:

$$PIX=TC*RH/(2000*D*\tan(AVH/2))$$

wherein:
PIX=Resulting size of the visual code in the image (in pixels)
TC=Size of the printed visual code (in mm).
RH=Horizontal resolution of the image (in pixels)
D=Distance from the camera to the label (in meters)
AVH=Horizontal angle of view of the camera (in degrees)

In theory, and restricted to cameras with the above-mentioned optics, this also allows for the detection and decoding of codes printed with size of, for example, 200 mm width at distances of more than 60 metres (for the viewing angle corresponding to the largest zoom supported by the camera optics, 37°, and its highest resolution, 3840×2160 pixels). Of course, by mounting telephoto lenses with larger focal lengths (and therefore smaller viewing angle), these decoding distances may be increased even further. In the particular scenario of this example, however, in no case a configuration of such features is necessary, so smaller sizes may be used in the final implementation, with visual codes printed at a width of 80 mm and viewing distances typically less than 10 m, thus being possible to increase the viewing angle to a value of around 80°, which allows the size of the detection area covered by each camera to be increased. At all times the system shows good tolerance to different noise sources which result in different causes of image blur, such as exceptional blurs, rapid movements in the scene, "salt and pepper" noise in the sensed image caused by low lighting conditions, and even artifacts caused by compression of the image.

It is important to note that both the encoding method and the decoding method previously described may be implemented each with a system with a fully computerized, fully electronic configuration or a combination of both.

In the case of a system that is purely computer-based (for example a computer server), the system may include a memory and a processor (for example a microprocessor), wherein the memory stores computer program instructions executable by the processor, these instructions including functionalities to execute a method to decode or a method to encode a visual code such as the ones described.

The memory of this computer system may be included in the processor or it may be external. If it is included in the processor itself, it may be, for example, an EEPROM or similar memory. If it is external, it may be, for example, data storage media such as magnetic disks (for example hard disks), optical disks (for example DVDs or CDs), memory cards, flash memories (for example USB memories) or solid state drives (RAM-based SSDs, flash-based drives, etc.). These storage media may be part of the computer system itself and/or may be arranged remotely with respect to the system, wire connected (with cables) or wirelessly. In the case of a wired communication, the connection may be performed via serial ports, such as USB, micro USB, mini USB, Firewire or Ethernet. In the case of wireless communications, the connection may be performed via short range wireless communication modules (the system and the storage media are close enough to each other), for example, Bluetooth, NFC, Wifi, IEEE 802.11 or Zigbee. If communications are long-range (the system and the storage media are far away from each other), the connection may be performed using communication modules based on GSM, GPRS, 3G, 4G, 5G or satellite technology (for example, if communication is performed via a global communications network, such as the Internet) or even via a communications network for the Internet of Things (IoT). In this latter case of a system with the storage media arranged remotely, the communication established between the system and the storage media may be secured by, for example, user name/password, cryptographic keys and/or by an SSL tunnel established in the communication between the system and the storage media.

Therefore, the set of computer program instructions (a computer program) executable by the processor may be stored on physical storage media, such as those mentioned above, but may also be carried by a carrier wave (the carrier wave may be any entity or device capable of carrying the program), such as electrical or optical, which may be transmitted via electrical or optical cable or by radio or other device, system or method. Thus, when the computer program is contained in a signal which may be transmitted directly by a cable or other device or medium, the carrier medium may be formed by such a cable or other device or medium.

Alternatively, the carrier medium may be an integrated circuit in which the computer program is embedded, said integrated circuit being adapted to perform or be used in performing the relevant methods.

The computer program may be in the form of source code, object code or in an intermediate code between source and object code, such as in partially compiled form, or in any other form suitable for use in the implementation of the methods described.

On the other hand, at least one of the systems (the one that executes the encoding method and/or the one that executes the decoding method) may have a purely electronic configuration, so it could be formed by a programmable electronic device such as a CPLD (Complex Programmable Logic Device), an FPGA (Field Programmable Gate Array) or an ASIC (Application-Specific Integrated Circuit).

Finally, at least one of the systems may also have a hybrid configuration between computing and electronics. In this case, the system must include a memory and a processor to implement a part of its functionalities in computer-based manner, as well as certain electronic circuits to implement the rest of the functionalities.

Despite the fact that only some particular embodiments and examples of the inventions hereof have been described herein, the person skilled in the art will understand that other alternative embodiments and/or uses of the inventions are possible, as well as obvious modifications and equivalent elements. Furthermore, the present inventions cover all the possible combinations of the particular embodiments described herein. Numerical signs relating to the drawings and placed in brackets in a claim are only to try to increase the understanding of the claim, and they should not be interpreted as limiting the scope of protection of the claim. The scope of the present inventions should not be limited to particular embodiments, but it should be determined only by a proper reading of the attached claims.

The invention claimed is:

1. Method for decoding a visual code reproduced on an identification label, comprising
capturing a flat image of the label using an optical sensor;
locating a candidate code in the flat image;
extracting a quadrangular contour of the candidate code;
using the four corners of the quadrangular contour to rectify the candidate code homographically into a rectified quadrangle;
calculating the Discrete Fourier Transform (DFT) of the rectified quadrangle;
extracting from the DFT of the rectified quadrangle c dominant frequency components, both for a first spatial frequency u' and for a second spatial frequency v';
seeking an identification among the c dominant frequency components of first spatial frequency u' and second spatial frequency v' with c two-dimensional waves from a predetermined collection of two-dimensional waves, each of which being determined by at least two parameters, namely, a first spatial frequency u in a first direction and a second spatial frequency v in a second direction different from the first direction.

2. Method according to claim 1, comprising obtaining from the DFT of the rectified quadrangle the phases of the c dominant frequency components.

3. Method according to claim 2, comprising sorting in decreasing order of magnitude the c dominant frequency components of first spatial frequency u' and second spatial frequency v', and assigning an ordinal number between 1 and c to the c dominant frequency components of the first spatial frequency u' and the second spatial frequency v', the order magnitude being a scalar frequency w' defined by the equation $w'^2 = (u'^2 + v'^2)$.

4. Method according to claim 3, comprising extracting other k components c+1, ... c+k of corresponding frequencies u' and v', with k>1, as long as at least one of the frequencies of the component c+1 is of non-zero magnitude.

5. Method according to claim 4, comprising considering the visual code as well decoded as long as there is a difference of magnitude greater than a predetermined amount between the frequency components c and c+1, or,
comprising considering the visual code as well decoded as long as the maximum difference between phases of the c dominant frequency components and phases of a predetermined set of possible phases is less than a predetermined amount, or,
comprising considering the visual code as not decoded if between the frequency components c and c+1 a difference of magnitude of less than a predetermined amount is present.

6. Method according to claim 3, comprising considering the visual code as not decoded if the maximum difference between phases of the c dominant frequency components and phases of a predetermined set of possible phases is greater than a predetermined amount.

7. Method according to claim 4, comprising:
generating various combinations of c frequency components out of the c+k components extracted;
sorting in decreasing order of magnitude each of the c frequency components u' and v' extracted;
assigning to each of the c dominant frequency components an ordinal number between 1 and c.

8. Method according to claim 7, comprising considering the visual code as well decoded, as long as at least one of the combinations of c frequency components out of the extracted c+k components corresponds to a visual code that differs from the flat image by a magnitude of less than a predetermined amount, or comprising considering the visual code as not decoded if none of the combinations of c frequency components out of the extracted c+k components corresponds to a visual code that differs from the flat image by a magnitude of less than a predetermined amount.

9. Method for encoding a two-dimensional image, comprising:

predefining a collection of two-dimensional waves as potential components of the two-dimensional image, each of the two-dimensional waves being determined by at least two parameters, namely, a first spatial frequency u in a first direction and a second spatial frequency v in a second direction different from the first direction;

predetermining a natural number c of said two-dimensional waves to compose the two-dimensional image;

selecting a number c of two-dimensional waves out of all the two-dimensional waves in the collection;

composing the two-dimensional image by applying a predetermined mathematical operation on the selected c two-dimensional waves;

forming a visual code by framing the two-dimensional image with a band of a predetermined colour whose contour is a predetermined closed flat curve;

reproducing the visual code on a label.

10. Method according to claim 9, one or both:

the two-dimensional waves are two-dimensional sinusoids, or the mathematical operation on the selected c two-dimensional waves is an addition.

11. Method according to claim 9, including one or both:

determining each two-dimensional wave by at least three parameters, namely, the mentioned first and second frequencies and, furthermore, an angular phase, said phase being a real number, or determining each two-dimensional wave by at least three parameters, namely, the mentioned first and second frequencies and, furthermore, an amplitude, the amplitude being a real number.

12. Method according to claim 11, the angular phase being selected from a finite set, and the spatial frequencies being selected from a finite set, and the collection of two-dimensional waves being finite.

13. Method according to claim 12, comprising sorting the two-dimensional waves of the collection in increasing order of magnitude of a scalar frequency w of each two-dimensional spatial wave, said scalar frequency w being defined by the equation $w'^2=(u'^2+v'^2)$.

14. Method according to claim 13, comprising assigning an ordinal number to each two-dimensional wave of the collection, in accordance with the previous sorting.

15. Method according to claims 12, comprising assigning an ordinal number to each possible two-dimensional spatial wave in accordance with an enumeration criterion.

16. Method according to claim 15, the enumeration criterion following an increasing order of scalar frequency or an increasing order of angular phase.

17. Method according to claim 16, for each scalar frequency in increasing order, all angular phases are traversed through, or in that, for each angular phase in increasing order, all scalar frequencies are traversed through.

18. Method according to claim 9, comprising increasing the contrast of the two-dimensional image resulting from the predetermined mathematical operation on the selected c two-dimensional spatial waves.

19. Method according to claim 18, comprising increasing the contrast of the two-dimensional image resulting from the mathematical operation on the selected c two-dimensional spatial waves, until producing a two-dimensional image saturated to black and white.

20. Method according to claim 12, comprising analysing all the possible two-dimensional images in black and white format, and marking as undesirable all the two-dimensional images whose frequencies configurations present harmonics predefined as undesired.

* * * * *